Figure 1:
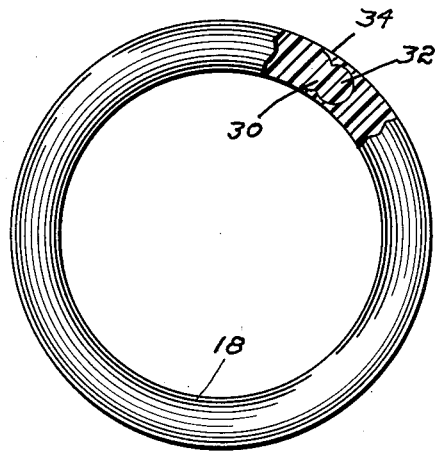

April 12, 1966   D. G. WAY   3,245,693
SEALING RINGS
Filed June 5, 1964

Inventor:
David G. Way,
by Abb H Spear,
Attorney

United States Patent Office 3,245,693
Patented Apr. 12, 1966

3,245,693
SEALING RINGS
David G. Way, Boxborough, Mass.
(R.F.D., West Acton, Mass.)
Filed June 5, 1964, Ser. No. 372,906
4 Claims. (Cl. 277—222)

The present invention relates to sealing rings that may be closed about a member and this application is a continuation-in-part of my now abandoned application Serial No. 108,043, filed May 5, 1961.

Sealing rings are widely used in many places where their replacement is difficult. By way of illustration, sealing rings are commonly used between the end walls of a pump and its gland and in the shaft seal backed by that gland. Should leakage develop that is due to failure of a sealing ring, that particular ring can usually be exposed without too much trouble. It cannot be replaced, however, with presently available sealing rings, until the end of the pump shaft has been freed to enable parts to be removed so that the replacement sealing ring can be slipped over the shaft and into place. There is, accordingly, a real need for a sealing ring that can be closed about a member.

Such sealing rings, while commonly of stock that is of circular cross section and known as "O-rings," are also available in non-circular cross sectional shapes such, for example, as X, square, and triangular shapes. The present invention is concerned with any such sealing rings of resilient and deformable rubber or plastic stock that may be closed about a member but is herein discussed with particular reference to O-ring embodiments. It will be understood, however, that the term "sealing rings" is intended to include O-rings and other rings of the same general type whatever their cross sectional shape.

The principal objective of the invention is to provide a seal in the form of an open or openable sealing ring that may be closed about a member. In accordance with the invention, this objective is attained by providing an elongated, sealing ring establishing body of resiliently yieldable stock with one end of the body having a socket to receive a mating projection on the other end thereof to provide a releasable joint to convert the body into a sealing ring. The projection includes a forwardly and inwardly tapering portion, a head, and an intermediate neck with the dimensions of the tapering portion closely approximating the dimensions of the body in the area adjacent thereto. The socket is complementally sized and shaped for mating engagement with the projection thus to yieldably receive and hold the head of the projection and to provide a skirt to overlie and resiliently engage the tapering portion with its free edge engaging the junction of the tapering portion and the body.

Another objective is to provide sealing ring establishing members wherein the axial extent of the socket is greater than that of the projection thereby to provide excess stock in the free end of the socket, a construction of particular value when the sealing ring establishing body has a normal straight form although also of use when the body has been molded to have a normal circular form.

In the accompanying drawings, there are shown illustrative embodiments of the invention from which these and other of its objectives, and also its novel features and advantages, will be apparent.

Figure 2:
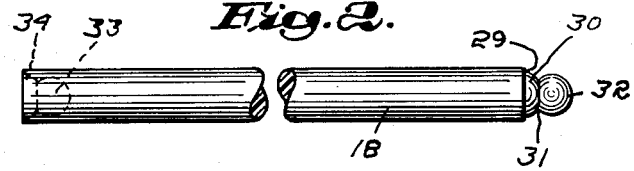
Figure 3:
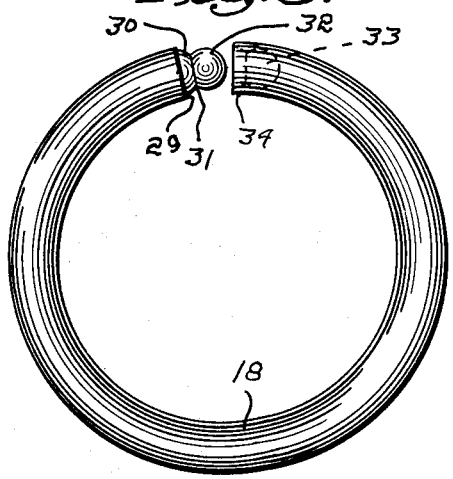
Figure 5:
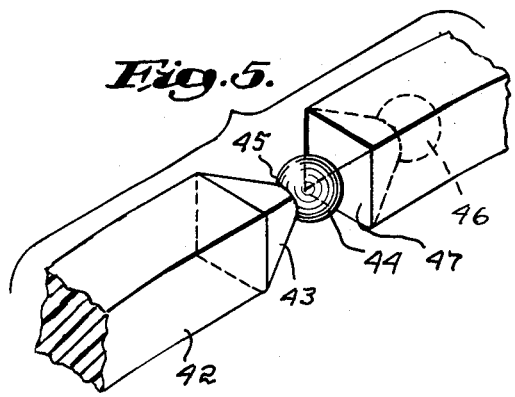
Figure 4:
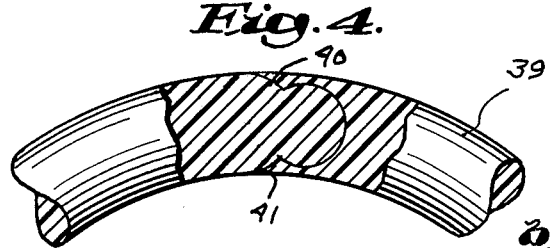

In the drawings:

FIGURE 1 is a partly sectioned elevation of an O-ring in accordance with the invention, FIGURE 2 is an elevation of the seal body removed from the mold, FIGURE 3 is a side elevation of a finished O-ring, shown as opened, FIGURE 4 is a partly sectioned, side view of an O-ring, illustrating a modification of the invention, and FIGURE 5 is a partly sectioned, fragmentary, perspective view illustrating yet another embodiment of the invention.

Referring to FIGURES 1 through 3, an O-ring body 18, molded from rubber or other suitable moldable material has, at one end, a projection defining a body shoulder 29, a forwardly and inwardly tapering portion 30, a head 32, and an intermediate neck 31 and the maximum diameter of the tapering portion 30 closely approaches the diameter of the body 18. The tapering portion 30 is preferably, but not necessarily, spherical, both to lend itself to ease of manufacture and to minimize mismatching when the body 18 is bent into a circle. At its other end, the body 18 has a socket indicated at 33 which, as it is complemental in size and shape to the projection, is not described in detail other than to point out that its free end is in the form of a skirt 34, preferably but not necessarily, somewhat longer than the tapering portion 30 of the projection.

With reference to FIGURE 2 it will be noted that the body 18 is straight, having been molded so that it has a normal straight form, and it is important to note, reference being here made to my co-pending application Serial No. 108,043, filed May 5, 1961, for which, methods of sealing ring manufacture are detailed, that the body 18 shown in FIGURE 2 may be regarded as fully cured, in which case it is ready to use, once any flashing is trimmed, upon the entry of its projection into its socket. The body 18 shown in FIGURE 2 may be, however, only sufficiently cured to ensure the full formation of its projection and socket with the final cure being performed in a circular mold with the body converted into ring form by the entry of its projection into its socket but with a release agent, or a film or foil layer interposed to ensure their release after the completion of the molding cycle. The body 18 then has a natural circular form such as shown in FIGURE 3.

In FIGURE 4, an O-ring 39 is shown that is identical to the O-ring 18 except that the forwardly and inwardly tapering portion 40 of the projection does not establish a shoulder at its junction with the main portion of its body and that the free extremity of its cavity is in the form of a skirt 41 tapering to as close to a feather edge as is practicable in molding.

In FIGURE 5, a sealing ring 42 is shown as having a substantially rectangular cross section as illustrative of sealing rings of non-circular cross sectional shapes. The sealing ring 42 has a forwardly and inwardly tapering portion 43 at one end, a head 44, and an intermediate neck 45. At its other end the ring 42 has a socket complemental in size and shape to the projection and including a head-receiving recess 46 and a skirt 47 to overlie and engage the forwardly and inwardly tapering portion 43. Both the skirt 47 and the forwardly and inwardly tapering poriton 43 are shown as of the same rectangular cross sectional shape.

It will be apparent that, with any sealing ring in accordance with the invention, the complemental socket and projection ensure that it may be securely joined about a member and that a titght joint results due to the fact that the dimensions of the tapering portion are a close approximation to the dimensions of the ring body adjacent thereto.

I claim:

1. An elongated, one-piece, sealing ring establishing body of resiliently yieldable stock, one end of said body having a socket and the other end thereof including a projection providing a releasable joint converting said body into a sealing ring when entered in said socket, said projection including a forwardly and inwardly tapering portion, a head, and an intermediate neck, the dimensions of said tapering portion closely approximating the dimensions of said body in the area adjacent thereto, and said socket being complementally sized and shaped for mating engagement with said projection and thus including a head-enclosing chamber to yieldably receive and hold said head and a forwardly and outwardly tapering skirt to overlie and resiliently engage said tapering portion with its free edge substantially in engagement with the junction of said tapering portion with said body, said skirt presenting surfaces wedged apart by said head during such mating and the dimensions of said projection being such as to result in a chamber wall thickness that has substantially less resistance in an annular zone to axial deformation than said projection as said skirt is wedged apart to permit said head to enter said chamber.

2. The sealing ring establishing body of claim 1 in which the forwardly and inwardly tapering portion of the projection is spherical.

3. The ring establishing body of claim 1 characterized by its having a normal, straight form, by the body having a slight shoulder at the junction therewith of the forwardly and inwardly tapering portion, and by the skirt of the socket being longer than the forwardly and inwardly tapering portion of the projection.

4. The sealing ring of claim 1 in which the forwardly and inwardly tapering portion of the projection and the interior of the skirt are of a non-circular cross sectional shape.

References Cited by the Examiner

UNITED STATES PATENTS

| | | | |
|---|---|---|---|
| 281,760 | 7/1883 | Gingras | 277—220 X |
| 1,271,077 | 7/1918 | Probasco | 277—221 |
| 2,464,653 | 3/1949 | Phipps | 277—221 |
| 2,768,036 | 10/1956 | Greenough. | |

FOREIGN PATENTS 476,019   11/1937   Great Britain.

LAVERNE D. GEIGER, *Primary Examiner.*

EDWARD V. BENHAM, LEWIS J. LENNY, *Examiners.*